(12) United States Patent
Santosuosso

(10) Patent No.: US 8,447,743 B2
(45) Date of Patent: May 21, 2013

(54) TECHNIQUES FOR PROCESSING DATABASE QUERIES INCLUDING USER-DEFINED FUNCTIONS

(75) Inventor: John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1673 days.

(21) Appl. No.: 10/920,098

(22) Filed: Aug. 17, 2004

(65) Prior Publication Data
US 2006/0041544 A1 Feb. 23, 2006

(51) Int. Cl.
*G06F 7/00* (2006.01)
*G06F 17/00* (2006.01)
*G06F 17/30* (2006.01)

(52) U.S. Cl.
USPC .......................................... 707/694; 707/771

(58) Field of Classification Search
None
See application file for complete search history.

(56) References Cited

U.S. PATENT DOCUMENTS

| | | | | |
|---|---|---|---|---|
| 6,338,056 B1 * | 1/2002 | Dessloch et al. | | 707/2 |
| 6,356,888 B1 * | 3/2002 | Egan et al. | | 707/2 |
| 7,606,792 B2 * | 10/2009 | Cunningham et al. | | 1/1 |
| 7,890,480 B2 * | 2/2011 | Barsness et al. | | 707/702 |
| 2005/0210023 A1 * | 9/2005 | Barrera et al. | | 707/5 |

OTHER PUBLICATIONS

Ordonez et al., "Fast UDFs to compute sufficient statistics on large data sets exploiting caching and sampling", Data and Knowledge Engineering 69, pp. 383-398, 2010, Elsevier B.V.*

* cited by examiner

*Primary Examiner* — Michael Hicks
(74) *Attorney, Agent, or Firm* — Patterson & Sheridan, LLC

(57) ABSTRACT

A method, system and article of manufacture for query execution management in a data processing system and, more particularly, for managing execution of queries including user-defined functions. One embodiment includes an operation for managing execution of a query against data of a database. The operation includes receiving a query against the data of the database, the query having at least one query condition including a user-defined function. It is determined whether the user-defined function satisfies a predefined index applicability criterion. If the user-defined function satisfies the predefined index applicability criterion, an index over relevant data of the database is created for the user-defined function. The index is suitable for use in execution of the query against the data of the database to determine a corresponding query result.

25 Claims, 10 Drawing Sheets

| 171 | 172 | 174 | 175 | 176 | 178 | 179 |
|---|---|---|---|---|---|---|
| UDF ID | DETER-MINISTIC | COMMIT OPTION | VALUE RANGE | TIME RANGE | TABLE DEPENDENCIES | UDF CODE |
| 1 | N | Y | 1 - 100 | N | A, B, C | IF... |
| 2 | N | N | 0 - 5000 | 8:00 AM-6:00 PM | D, E, F, G | IF... |
| ... | | | | | | ... |

Table 146, columns 182/184 indicated.

FIG. 1B

| 191 | 192 | 193 | 194 | 195 | 196 |
|---|---|---|---|---|---|
| UDF ID | INPUT VALUES | OUTPUT VALUES | COMMIT ID | DATE | TIME |
| 1 | 1, 7, 8, 9, 25, 33 | 40 | C1 | 05/30/04 | 10:00 AM |
| 2 | 0, 2, 5000 .... | 5 – 4579 | C2 | 05/30/04 | 11:00 AM |
| ... | | | | | ... |

Table 147, columns 197/198 indicated.

FIG. 1C

TECHNIQUES FOR PROCESSING DATABASE QUERIES INCLUDING USER-DEFINED FUNCTIONS

BACKGROUND OF THE INVENTION

1. Field of the Invention

The present invention generally relates to query execution management and, more particularly, to managing execution of queries including user-defined functions.

2. Description of the Related Art

Databases are computerized information storage and retrieval systems which can be organized in multiple different ways. An overall database organization is typically referred to as a schema for the database, such as a hierarchical or relational schema. A database schema is often compactly expressed using table names and names of columns in tables. Database schemas frequently take the form of a "star", where there is one large "mother" table and many small "detail" tables. For instance, a simple database schema including a large mother table "Name/Address" and a small detail table "City" could be expressed as:

Name/Address (LastName, FirstName, M.I., Postal Code, . . . ) City (CityName, PostalCode)

By way of example, the Name/Address table stores names, addresses and additional information for individuals in a multiplicity of columns "LastName", "FirstName" etc. Each row of the Name/Address table is associated with a specific individual. The City table stores city names and postal codes in two columns "CityName" and "PostalCode", respectively. Each row of the City table links a particular city name to a specific postal code. The PostalCode columns in the City and Name/Address tables are configured to join both tables.

Regardless of the particular database schema, a requesting entity (e.g., an application, the operating system or a user) demands access to a specified database by issuing a database access request. Such requests may include, for instance, simple catalog lookup requests or transactions and combinations of transactions that operate to read, change and add specified records in the database. These requests are made using high-level query languages such as the Structured Query Language (SQL) in the case of a relational database. Illustratively, SQL is used to make interactive queries for getting information from and updating a database such as International Business Machines' (IBM) DB2, Microsoft's SQL Server, and database products from Oracle, Sybase, and Computer Associates. The term "query" denominates a set of commands for retrieving data from a stored database.

Queries take the form of a command language that lets programmers and programs select, insert, update, find out the location of data in a database, and so forth. For instance, SQL supports four types of query operations, i.e., SELECT, INSERT, UPDATE and DELETE. A SELECT operation retrieves data from a database, an INSERT operation adds new data to a database, an UPDATE operation modifies data in a database and a DELETE operation removes data from a database. Furthermore, customized operations can be created as extensions to SQL using user-defined functions (UDFs). A UDF is a mechanism which allows users to create user or application-specific operations for use with SQL. By way of example, UDFs can be created to perform calculations, both simple and complex. However, the complexity of UDFs may greatly differ from case to case. For instance, in some simple cases UDFs can be provided to convert to uppercase and trim a character field. In more complex cases, UDFs can be provided to convert to uppercase and trim a field based on the field's value and subsequently concatenate the field with something else. In still more complex examples, UDFs may convert values using complex mathematical expressions.

Queries typically involve data selections based on attributes of detail tables followed by retrieval of information for searched data records, i.e., rows from a corresponding mother table. By way of example, using the City and Name/Address tables, a query can be issued to determine all individuals living in a particular city. To this end, all rows in the City table would be scanned to find those rows having the corresponding city name in the CityName column, and then the postal codes in those rows would be retrieved from the PostalCode column. Subsequently, the Name/Address table would be scanned to locate all rows having one of the retrieved postal codes in the PostalCode column. The located rows contain the searched information related to the individuals residing in the particular city.

Queries and, consequently, query workload can consume significant system resources, particularly processor resources. The system resources consumption of a query against one or more databases depends on the complexity of the query and the searched database(s). A typical way of reducing system resource consumption for looking up information in tables of a database consists in using indexes. One type of index is a bitmap index, which indicates whether a specific value exists for each row in a particular column. One bit represents each row. Accordingly, there may be an index into the Name/Address table identifying all rows in the PostalCode column that have a particular postal code value. For instance, in the bitmap index for the PostalCode column, the nth bit equals 1 if the nth row of the Name/Address table contains a value of "45246", or 0 if that row holds a value other than "45246". Typically there are multiple bitmap indexes for each column, one for each of several values that may appear in the column (e.g., one index for the value "45246", another index for the value "45202", and so on). Another type of index is an encoded vector index (EVI), disclosed, for example, in U.S. Pat. No. 5,706,495, issued Jan. 6, 1998 to Chadha et al., entitled ENCODED-VECTOR INDICES FOR DECISION SUPPORT AND WAREHOUSING, which is incorporated herein by reference. An EVI serves a similar purpose as a bitmap index, but only one index is necessary to account for all values occurring in the column (whether they are "45246", "45202", or any other). Accordingly, in an EVI on the PostalCode column, the nth position of the EVI contains a bit code that can be decoded using a lookup table to produce the value "45246", which is the postal code in the nth row of the table. Thus, whereas a separate bitmap index is required to map each particular key value in a database field, only one EVI is required to represent the same information. Therefore, an EVI saves computer memory by including all possible key values for a given field in one database index.

However, one shortcoming of the prior art is that indexes can generally not be used if a query condition of a corresponding query includes a UDF. More specifically, assume a SQL query having a WHERE clause, wherein the query condition is a predicate of the WHERE clause. Assume further that the query condition includes a UDF having an output which varies in response to the UDF's input. Because the required index in the case of corresponding bitmap indexes or the respective bit code in the case of a corresponding EVI may change with each new input value of the UDF such indexes are typically not allowed.

Therefore, there is a need for an effective query execution management in a data processing system for efficiently managing execution of queries having query conditions which include user-defined functions.

SUMMARY OF THE INVENTION

The present invention is generally directed to a method, system and article of manufacture for query execution management in a data processing system and, more particularly, for managing execution of queries including user-defined functions.

One embodiment provides a method for managing execution of a query against data of a database. The method includes receiving a query against the data of the database. The query has at least one query condition including a user-defined function. It is determined whether the user-defined function satisfies a predefined index applicability criterion. If the user-defined function satisfies the predefined index applicability criterion, an index over relevant data of the database is created for the user-defined function. The index is suitable for use in execution of the query against the data of the database to determine a corresponding query result.

Another embodiment provides another method for managing execution of a query against data of a database. The method includes receiving a query against the data of the database. The query has at least one query condition including a user-defined function. It is determined whether the user-defined function satisfies a predefined deterministic criterion. Further, it is determined whether cached results are available for the user-defined function. If the cached results are available for the user-defined function, the cached results are used in execution of the query against the data of the database to determine a corresponding query result only if the user-defined function satisfies the predefined deterministic criterion.

Another embodiment provides a computer readable medium containing a program which, when executed, performs a process for managing execution of a query against data of a database. The process includes receiving a query against the data of the database, the query having at least one query condition including a user-defined function. The process further includes determining whether the user-defined function satisfies a predefined index applicability criterion. If the user-defined function satisfies the predefined index applicability criterion, an index over relevant data of the database is created for the user-defined function. The index is suitable for use in execution of the query against the data of the database to determine a corresponding query result.

Another embodiment provides another computer readable medium containing a program which, when executed, performs a process for managing execution of a query against data of a database. The process includes receiving a query against the data of the database. The query has at least one query condition including a user-defined function. The process further includes determining whether the user-defined function satisfies a predefined deterministic criterion and determining whether cached results are available for the user-defined function. If the cached results are available for the user-defined function, the cached results are used in execution of the query against the data of the database to determine a corresponding query result only if the user-defined function satisfies the predefined deterministic criterion.

Still another embodiment provides a data processing system comprising a database having data and a query execution manager residing in memory for managing execution of a query against the data of the database. The query execution manager is configured for receiving a query against the data of the database, the query having at least one query condition including a user-defined function. The query execution manager is further configured for determining whether the user-defined function satisfies a predefined index applicability criterion. If the user-defined function satisfies the predefined index applicability criterion, an index over relevant data of the database is created for the user-defined function, whereby the index is suitable for use in execution of the query against the data of the database to determine a corresponding query result.

Still another embodiment provides another data processing system comprising a database having data and a query execution manager residing in memory for managing execution of a query against the data of the database. The query execution manager is configured for receiving a query against the data of the database, the query having at least one query condition including a user-defined function. The query execution manager is further configured for determining whether the user-defined function satisfies a predefined deterministic criterion and determining whether cached results are available for the user-defined function. If the cached results are available for the user-defined function, the cached results are used in execution of the query against the data of the database to determine a corresponding query result only if the user-defined function satisfies the predefined deterministic criterion.

BRIEF DESCRIPTION OF THE DRAWINGS

So that the manner in which the above recited features of the present invention are attained can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIGS. 1B-1C are views of components of FIG. 1A in one embodiment;

DETAILED DESCRIPTION OF THE PREFERRED EMBODIMENTS

Introduction

Figure 1A:
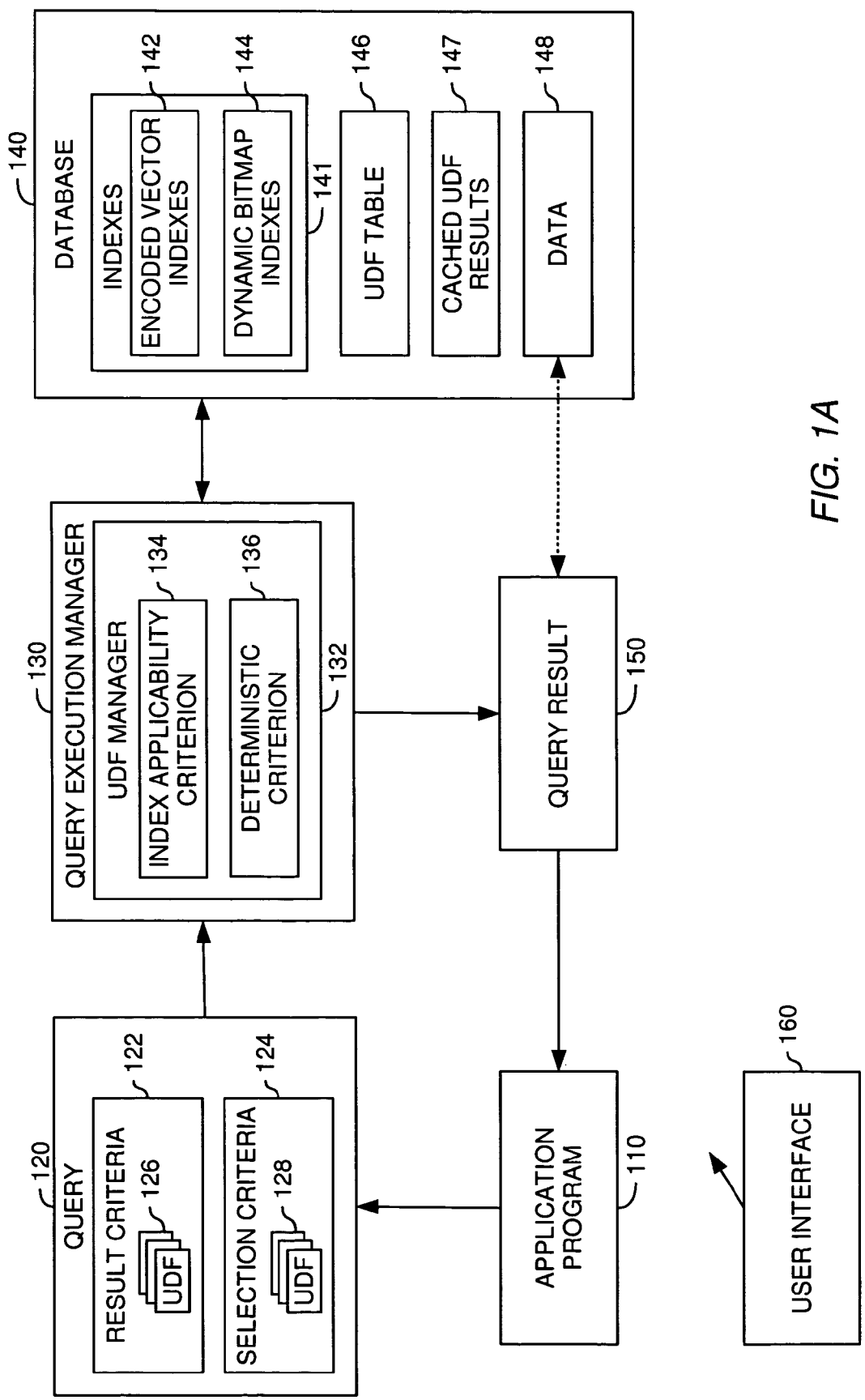
FIG. 1A is a relational view of components implementing the invention.

The present invention is generally directed to a method, system and article of manufacture for query execution management in a data processing system and, more particularly, for managing execution of queries having query conditions and/or result fields which are defined using user-defined functions. More specifically, in a data processing system queries are issued by an issuing entity, such as an application or a user, against one or more databases. Each query includes one or more result fields. Furthermore, each query may include one or more query conditions.

In one embodiment, at least one query condition of a given query is defined using a user-defined function (UDF). A UDF is a mechanism which allows users to create user or application-specific operations for use with a corresponding query language, such as SQL. The UDF may satisfy a predefined index applicability criterion. The predefined index applicability criterion defines whether an index, such as a bitmap index, a dynamic bitmap index, a radix tree index or an encoded vector index can be used with respect to the UDF in execution of the given query. In one embodiment, if the UDF is incremental, decremental or, more generally, to some extent deterministic, the predefined index applicability criterion is satisfied. If the predefined index applicability criterion is satisfied, an index can be created for the UDF over relevant data of the database. The index is suitable for use in execution of the given query against the data of the database to determine a corresponding query result.

In one embodiment, it is determined whether the UDF satisfies a predefined deterministic criterion. According to one aspect, the predefined deterministic criterion is satisfied if the UDF is (i) always deterministic, (ii) deterministic under certain predefined conditions, and/or (iii) if database tables accessed in a current execution of the UDF have not been modified since a last execution of the UDF. Further, it is determined whether cached results are available for the UDF. If the cached results are available for the UDF, the cached results can be used in execution of the given query against the data of the database to determine the corresponding query result. According to one aspect, the cached results are used only if the UDF satisfies the predefined deterministic criterion.

In one embodiment, if both the predefined deterministic criterion and the predefined index applicability criterion are satisfied, the cached results can be used in creation of a corresponding index for the UDF over the relevant data of the database. The corresponding index can then be used in execution of the given query against the data of the database.

Data Processing Environment

One embodiment of the invention is implemented as a program product for use with a computer system. The program(s) of the program product defines functions of the embodiments (including the methods described herein) and can be contained on a variety of computer readable media. Illustrative computer readable media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such computer readable media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Embodiments of the invention can be implemented in a hardware/software configuration including at least one networked client computer and at least one server computer. Furthermore, embodiments of the present invention can apply to any comparable hardware configuration, regardless of whether the computer systems are complicated, multi-user computing apparatus, single-user workstations, or network appliances that do not have non-volatile storage of their own. Further, it is understood that while reference may be made to particular query languages, including SQL, the invention is not limited to a particular language, standard or version. Accordingly, persons skilled in the art will recognize that the invention is adaptable to other query languages and that the invention is also adaptable to future changes in a particular query language as well as to other query languages presently unknown.

Preferred Embodiments

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and, unless explicitly present, are not considered elements or limitations of the appended claims.

An Exemplary Query Processing Environment

Referring now to FIG. 1A, an illustrative relational view of components of the invention is shown. In one embodiment, the components operate and interact in a data processing system for managing execution of queries, each having one or more query conditions, some of which are defined using UDFs. The components include an application program 110, a query execution manager 130, a UDF manager 132, one or more databases 140 and a user interface 160. Illustratively, the query execution manager 130 is shown including the UDF manager 132. However, in one embodiment the UDF manager 132 and the query execution manager 130 can be implemented separately as two distinct software components. Alternatively, the UDF manager 132 may be implemented as an integral part of the query execution manager 130. Thus, various different implementations of the UDF manager 132 and the query execution manager 130 are possible and, therefore, broadly contemplated. The user interface 160 is configured to allow user interaction with components of the data processing system, such as the application program 110 and the database(s) 140. For instance, the user interface can be used to specify UDFs and to create data to be stored in the database(s) 140. Interaction and operation of the application program 110, the query execution manager 130, the UDF manager 132, the database(s) 140 and the user interface 160 are described in more detail below with reference to FIGS. 2-7.

In one embodiment, the query execution manager 130 receives a query 120 from the application program 110 for execution against the database(s) 140. More generally, the query execution manager 130 can receive the query 120 from any issuing entity, including a user and/or an operating system. The database(s) 140 is representative of any collection of data regardless of the particular physical representation. By way of illustration, the database(s) 140 may be organized according to a relational schema (accessible by SQL queries) or according to an XML schema (accessible by XML queries). However, the invention is not limited to a particular schema and contemplates extension to schemas presently unknown. As used herein, the term "schema" generically refers to a particular arrangement of data.

Illustratively, the query 120 includes result criteria 122 defining one or more result fields to be returned after execution of the query 120 and selection criteria 124 defining one or more query conditions. In one embodiment, the result criteria 122 include one or more UDFs 126 and the selection criteria 124 include one or more UDFs 128. In general, a UDF is a mechanism which allows users to create user or application-specific operations, such as calculations on data 148 of the database 140. The complexity of UDFs may differ from case to case. For instance, in some simple cases UDFs can be provided to uppercase and trim a character field. In more complex cases, UDFs can be provided to uppercase and trim a field based on the field's value and then concatenate the field with something else. In still more complex examples, UDFs may use complex mathematical expressions, etc. Upon receipt of the query 120, the query execution manager 130 determines all result fields from the result criteria 122 and all query conditions from the selection criteria 124. Then, the query execution manager 130 determines whether any of the determined result fields and query conditions is defined using a UDF.

In one embodiment, if no UDF is included with the determined query conditions, the query execution manager 130 retrieves or generates indexes 141 on the data 148 of the database 140, such as encoded vector indexes (EVI) 142 or dynamic bitmap indexes 144, which are suitable for use with the determined query conditions. The query execution manager 130 then executes the query 120 using the retrieved/generated indexes 141.

Specifically, assume that for each of the determined query conditions a corresponding dynamic bitmap index 144 is retrieved or generated. According to one aspect, upon generation or retrieval of a dynamic bitmap index for each of the determined query conditions, the query execution manager 130 logically combines the generated and retrieved dynamic bitmap indexes according to Boolean operators which logically combine the determined query conditions in the query 120. Accordingly, the query execution manager 130 determines a single final dynamic bitmap index. The single final dynamic bitmap index indicates all rows in a table of the database(s) 140 which constitute a query result 150. More specifically, the single final dynamic bitmap index has a total number of rows that corresponds to the total number of rows of the table of the database(s) 140. Furthermore, the rows of the single final dynamic bitmap index and the rows of the table are ordered in the same sequence. For each row of the table that should be included in the query result 150, the single final dynamic bitmap index includes a bit set to "1". For all other rows that should not be included in the query result 150 the single final dynamic bitmap index includes a bit set to "0". Thus, the query result 150 is built on the basis of the single final dynamic bitmap index by including all rows of the table having a bit set to "1" in a corresponding row of the single final dynamic bitmap index into the query result 150. The query result 150 is then returned to the application program 110, which issued the query 120.

However, it should be noted that generating and using a single final dynamic bitmap index is merely one possible implementation. Other embodiments using other indexes, such as a radix tree index, an EVI or other bitmap indexes, are also contemplated. Furthermore, it should be noted that generation and use of indexes is well known in the art and will, therefore, not be explained in more detail. Moreover, it should be noted that generating a single final dynamic bitmap index is described by way of example, but does not limit the invention to this aspect. In other words, instead of generating dynamic bitmap indexes if they cannot be retrieved, corresponding EVIs or other available bitmap indexes can be retrieved and used together with retrieved dynamic bitmap indexes to determine a query result. Thus, generation of new dynamic bitmap indexes can be avoided.

In one embodiment, if the query execution manager 130 determines that a UDF is included with a given query condition, the UDF manager 132 analyzes and evaluates the UDF. More specifically, the UDF manager 132 retrieves a UDF table 146 from the database 140. The UDF table 146 is further described below with reference to FIG. 1B. Using the retrieved UDF table 146, the UDF manager 132 verifies whether the UDF satisfies a predefined index applicability criterion 134 and/or a predefined deterministic criterion 136. In one embodiment, if the UDF is incremental (hereinafter also referred to as "increasing"), decremental (hereinafter also referred to as "decreasing") or to some extent deterministic, the predefined index applicability criterion 134 is satisfied. If the UDF is (i) always deterministic, (ii) deterministic under certain predefined conditions, and/or (iii) if database tables of the database(s) 140 accessed in a current execution of the UDF have not been modified since a last execution of the UDF, the predefined deterministic criterion 136 is satisfied. Exemplary methods of determining whether the predefined index applicability criterion 134 and/or the predefined deterministic criterion 136 are satisfied are described below with reference to FIGS. 4-5.

In one embodiment, if the UDF satisfies the predefined index applicability criterion 134, one or more of the indexes 141 can be used in execution of the query 120 against the data 148 of the database(s) 140. If, however, the indexes 141 do not include an index related to a given query condition having the UDF, a corresponding UDF index can be created at runtime.

In one embodiment, if the UDF satisfies the predefined deterministic criterion 136, the UDF manager 132 determines whether cached UDF results 147 can be retrieved for the UDF. The cached UDF results 147 are further described below with reference to FIG. 1C. If the cached UDF results 147 can be retrieved for the UDF, the cached UDF results 147 can be used in evaluation of the query condition having the UDF and, thus, in execution of the query 120 against the data 148 of the database(s) 140.

An Exemplary UDF Table

Referring now to FIG. 1B, the UDF table 146 of FIG. 1A is shown in more detail. Illustratively, the UDF table 146 includes a plurality of rows 182 and 184 (only two rows are shown for brevity) and a plurality of columns 171-179. More specifically, each row of the UDF table 146 describes an associated UDF. In one embodiment, the different rows 182 and 184 of the UDF table 146 are generated at creation time of the associated UDFs. Creation of a UDF and generation of a corresponding row in the UDF table 146 is explained below with reference to FIG. 2A-B.

In one embodiment, the UDF table 146 includes a column "UDF ID" 171, a column "deterministic" 172, a column "commit option" 174, a column "value range" 175, a column "time range" 176, a column "table dependencies" 178 and a column "UDF code" 179. The "UDF ID" column 171 includes a unique identifier for each UDF described in the UDF table 146. Illustratively, the UDF described in row 182 has the unique identifier "1". The "deterministic" column 172 includes for each UDF an indicator, such as a deterministic flag, indicating whether the UDF is always deterministic. Illustratively, the UDF described in row 182 has a deterministic flag "N" in the "deterministic" column 172 indicating that the UDF is not always deterministic.

The "commit option" column 174 includes for each UDF an indicator indicating whether the UDF is deterministic for each commit cycle. A commit cycle is a logical unit of work. During a given commit cycle, modifications can be performed on the data 148 of the database(s) 140. These modifications are tracked using database logs and can be rolled back as long as the given commit cycle is not completed. In other words, the modifications have only a "temporary" character during the given commit cycle. Then, at the end of the given commit cycle, the modifications are committed i.e., performed, and become thus definitive at completion of the given commit cycle. Illustratively, the UDF described in row 182 has an indication "Y" in the "commit option" column 174 indicating that the UDF is deterministic during each commit cycle.

The "value range" column 175 includes for each UDF an indicator indicating whether the UDF is deterministic for a given range of values. More specifically, the "value range" column 175 specifies for each UDF which is deterministic for a given range of values a corresponding range of input values for which the UDF is deterministic. Illustratively, the UDF described in row 182 has a range of values "1-100" in the "value range" column 175 indicating that the UDF is deterministic for input values greater or equal than 1 and smaller or equal than 100.

The "time range" column 176 includes for each UDF an indicator indicating whether the UDF is deterministic for a given range of time. More specifically, the "time range" column 176 specifies for each UDF which is deterministic for a given range of time a corresponding time interval in which the UDF is deterministic. By way of example, the time interval can be specified on the basis of a date range or on an hourly basis. Illustratively, the UDF described in row 182 has an indicator "N" in the "time range" column 176 indicating that the UDF is not deterministic for a given time range. To the contrary, the UDF described in row 184 has a time range "8:00 AM-6:00 PM" in the "time range" column 176 indicating that the UDF is deterministic each day between 8:00 AM and 6:00 PM.

The "table dependencies" column 178 includes for each UDF described in the UDF table 146 a list of database tables accessed in execution of the UDF. Illustratively, the UDF described in row 182 has a list of database tables "A, B, C" indicating that tables "A", "B" and "C" are accessed in the execution of the UDF. The "UDF code" column 179 includes for each UDF described in the UDF table 146 corresponding UDF code defining an operation(s) to be performed by the UDF. Illustratively, the UDF described in row 182 has the actual code defining the UDF (e.g., "IF . . . "). In other words, the UDF described in row 182 is illustratively defined to execute an IF-clause on data in the database(s) 140.

An Exemplary Cached UDF Results Table

Referring now to FIG. 1C, the cached UDF results 147 of FIG. 1A are shown in more detail. By way of example, the cached UDF results are illustrated in tabular form including a plurality of rows 197 and 198 (only two rows are shown for brevity) and a plurality of columns 191-196. More specifically, each row of the cached UDF results table 147 describes a cached result for an associated UDF. In one embodiment, the different rows 197 and 198 of the cached UDF results table 147 are created each time one of the associated UDFs is executed. However, according to one aspect over-writing of an existing row is only performed in specific cases. For instance, assume a given UDF which is always deterministic. Assume further that all database tables which would be accessed in a current execution of the given UDF have not been changed since a last execution of the given UDF. Thus, as the given UDF is always deterministic, in both executions an identical result would be obtained so that over-writing of a corresponding cached UDF result can be omitted. A similar case occurs if a UDF which is deterministic for a given time range is executed two or more times within the given time range on unchanged database tables. Therefore, in one embodiment a user can identify such cases and use the user interface 160 to instruct the data processing system to disable over-writing in these cases.

In one embodiment, the cached UDF results table 147 includes a column "UDF ID" 191, a column "input values" 192, a column "output values" 193, a column "commit ID" 194, a column "date" 195 and a column "time" 196. The "UDF ID" column 191 includes unique UDF identifiers of UDFs for which cached results are stored in the cached UDF results table 147. Illustratively, the row 197 includes an entry "1" in the "UDF ID" column 191 indicating that the row 197 stores a cached UDF result for a UDF having the unique identifier "1" (i.e., the UDF specified in row 182 of FIG. 1B). The "input values" column 192 includes for each UDF a list of input values which have been input to the UDF at execution time. Accordingly, the "input values" column 192 may contain one or more single values or one or more ranges of values. Illustratively, a plurality of values "1, 7, 8, 9, 25, 33" is contained in the "input values" column 192 for the cached UDF result of row 197. The "output values" column 193 includes for each UDF a list of output values which have been obtained by execution of the UDF. Accordingly, the "output values" column 193 may contain one or more single values or one or more ranges of values. Illustratively, a single value "40" is contained in the "output values" column 193 for the cached UDF result of row 197. The "commit ID" column 194 includes for each cached UDF result in the cached UDF results table 147 a unique commit identifier. Each unique commit identifier uniquely identifies a corresponding commit cycle of execution of a respective UDF. Illustratively, the row 197 includes an entry "C1" in the "commit ID" column 194 indicating that the UDF, for which the cached UDF result of row 197 has been obtained, has been executed in a commit cycle which is uniquely identified by the identifier "C1". Furthermore, each cached UDF result is associated with a corresponding timestamp described in the "date" column 195 and the "time" column 196. The timestamp indicates when the cached UDF result has been obtained, i.e., when the corresponding UDF has been executed. Illustratively, the cached UDF result of row 197 has been obtained on May 5, 2004 (column 195) at 10:00 AM (column 196).

Creation of a UDF and a UDF Table

Figure 2A:
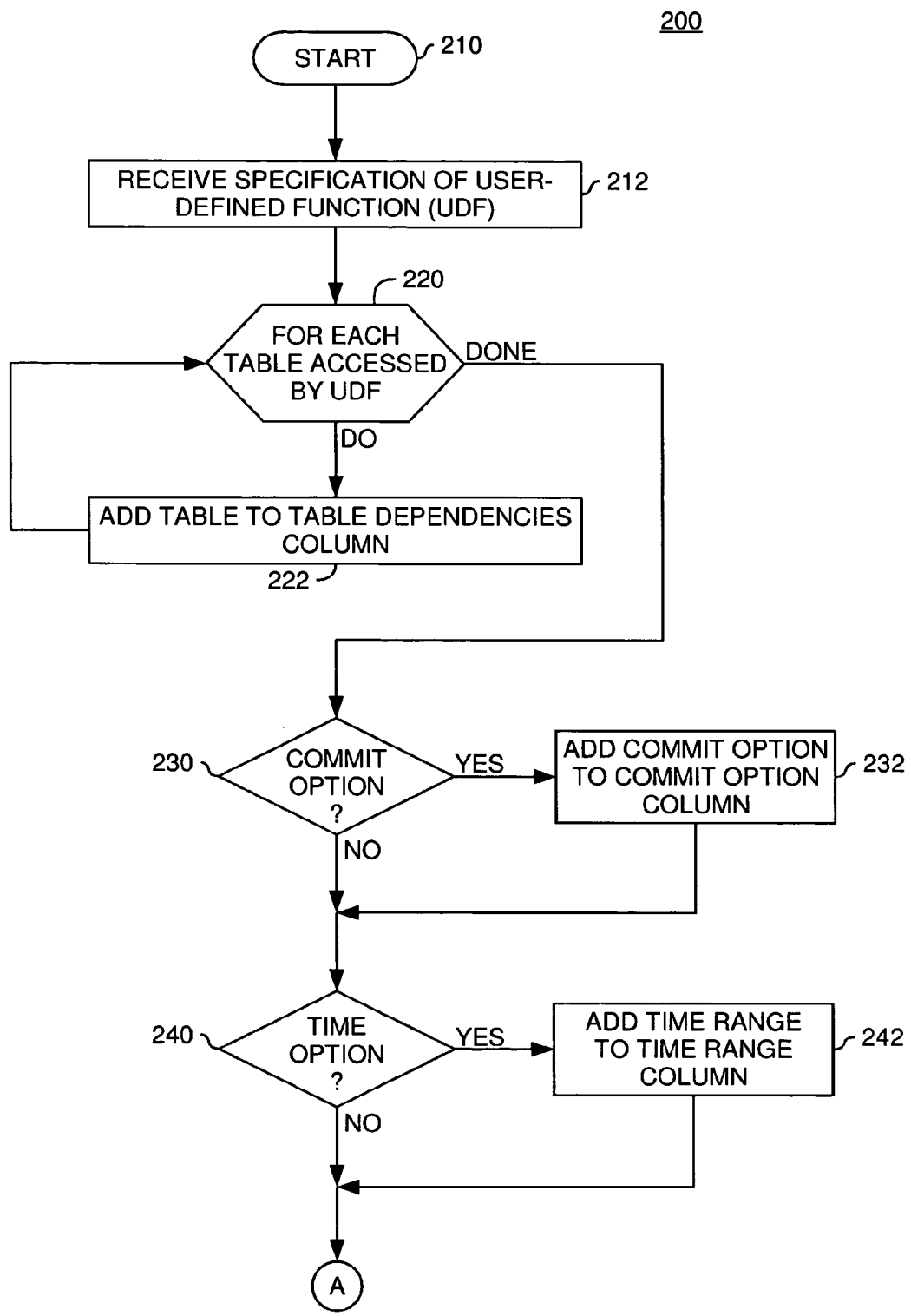
FIGS. 2A-B is a flow chart illustrating creation of user-defined functions in one embodiment.
Figure 2B:
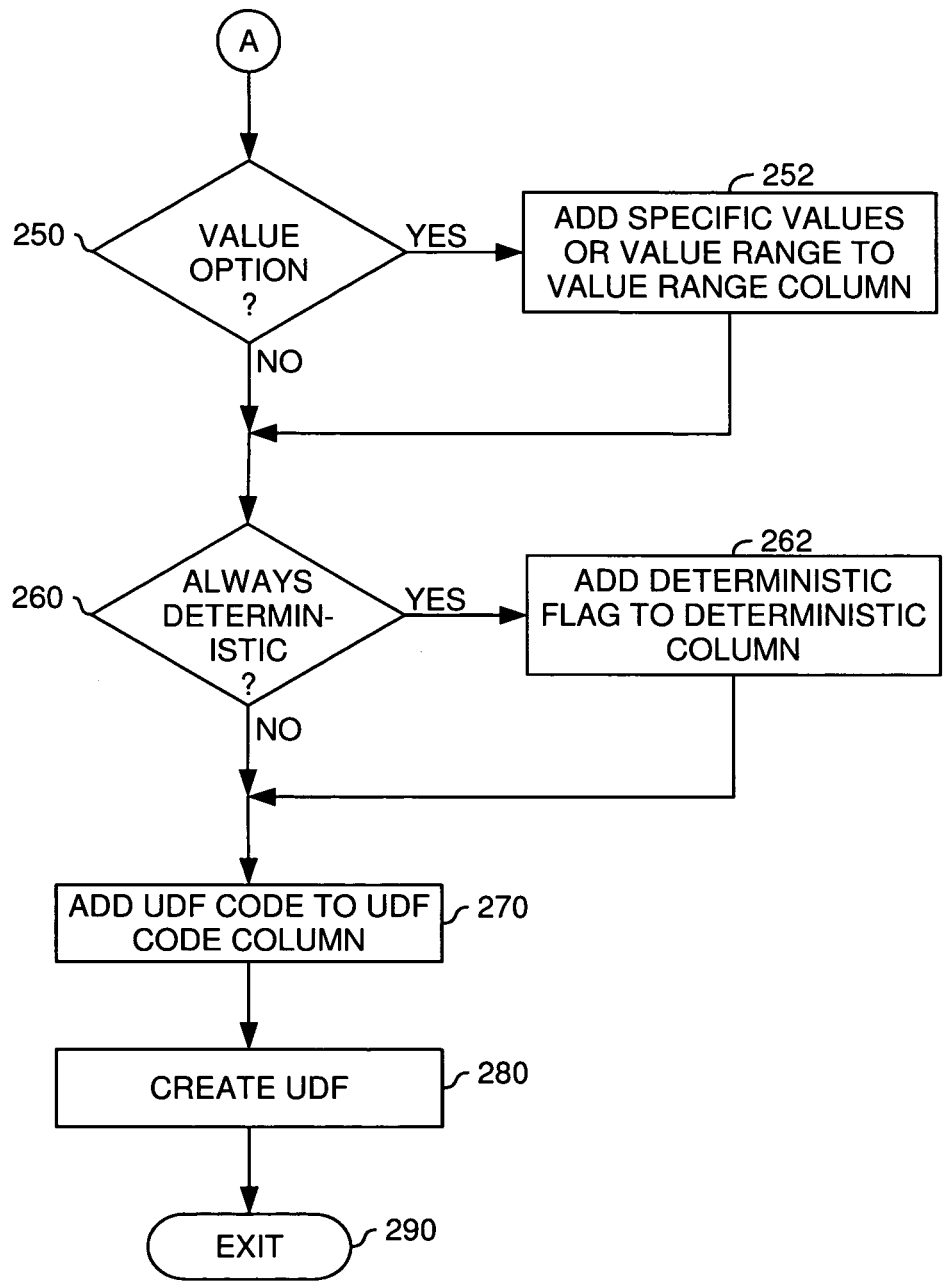

Referring now to FIG. 2A-B, an exemplary method 200 for creation of a UDF (e.g., UDF 126 or 128 of FIG. 1A) and generation of a row (e.g., row 182 or 184 in FIG. 1B) representing the UDF in the UDF table 146 of FIG. 1B is illustrated. In one embodiment, the method 200 is performed by a UDF manager (e.g., UDF manager 132 of FIG. 1A). Method 200 starts at step 210.

At step 212, a specification of a UDF is received. Upon receipt of the UDF specification, the UDF manager creates a corresponding identifier in column 171 of the UDF table 146. According to one aspect, the UDF specification includes indications directed towards at least a portion of the columns 172-179 of the UDF table 146. In one embodiment, missing indications can be determined by executing the UDF and tracking execution and obtained UDF results. The UDF specification can be created and submitted by a user via the user interface 160. However, it should be noted that receipt of the UDF specification is merely described by way of example. Instead, all information required in processing of the remaining steps of FIG. 2A-B can be provided at runtime. For instance, according to one aspect the user interface 160 may prompt the user sequentially at steps 220, 230, 240, 250, 260 and 270 to enter corresponding required information.

At step 220, a loop consisting of steps 220 and 222 is entered. The UDF manager performs the loop for each database table accessed by the UDF. The database table(s) accessed by the UDF can be determined from the UDF specification or by executing the UDF and tracking the accessed database tables. The UDF manager enters an indication of accessed database tables into a list of table dependencies into column 178 of the UDF table 146, at step 222. When the accessed database tables have been added to the list of table dependencies, processing continues at step 230.

At step 230, the UDF manager determines whether a commit option is specified in the UDF specification. In other words, the UDF manager determines whether the specification of the UDF indicates that the UDF is deterministic for each commit cycle. If the UDF specification includes such an indication, a corresponding flag is set in the "commit option" column 174 of the table 146 at step 232. Processing then continues at step 240. If, however, it is determined at step 230 that the specification does not include such an indication, processing continues directly at step 240.

At step 240, the UDF manager determines whether a time range option is specified in the UDF specification. In other words, the UDF manager determines whether the specification of the UDF indicates that the UDF is deterministic for a given time range. In one embodiment, if the UDF is deterministic for a given time range, the UDF specification includes corresponding boundary time values defining the given time range. If the UDF specification includes such boundary time values, the boundary time values are inserted into the "time range" column 176 of the table 146 at step 242. As was noted above, the boundary time values may indicate dates or hours or any other values suitable for defining a time range. Processing then continues at step 250. If, however, it is determined at step 240 that the specification does not include such an indication, processing continues directly at step 250.

At step 250, the UDF manager determines whether a value range option is specified in the UDF specification. In other words, the UDF manager determines whether the specification of the UDF indicates that the UDF is deterministic for a given range of input values. In one embodiment, if the UDF is deterministic for a given range of input values, the UDF specification includes corresponding boundary values defining the range of input values. If the UDF specification includes such boundary values, the boundary values are inserted into the "value range" column 175 of the table 146 at step 252 for defining the given range of input values. Processing then continues at step 260. If, however, it is determined at step 250 that the specification does not include such an indication, processing continues directly at step 260. It should be noted that according to one aspect the boundary values can also be determined by executing the UDF on expected or required input values.

At step 260, the UDF manager determines whether the UDF is always deterministic. In other words, the UDF manager determines whether the specification of the UDF indicates that the UDF is always deterministic. If the specification includes such an indication, a corresponding flag is set in the "deterministic" column 172 of the table 146 at step 262. Processing then continues at step 270. If, however, it is determined at step 260 that the specification does not include such an indication, processing continues directly at step 270.

At step 270, corresponding UDF code provided with the UDF specification is entered into column 179 of the table 146. Then, at step 280, the corresponding UDF is created on the basis of the UDF specification. However, it should be noted that creation of UDFs is well known in the art and will, therefore, not be explained in more detail. Method 200 then exits at step 290.

As was noted above, queries issued against data of one or more databases may include one or more UDFs. More specifically, a given query may include result criteria (e.g., result criteria 122 of FIG. 1A) and selection criteria (e.g., selection criteria 124), which are defined using one or more associated UDFs (e.g., UDFs 126 and 128, respectively). The queries can be executed against the data of the database(s) using a query execution manager. If a given query includes one or more UDFs, the UDF(s) can be analyzed and evaluated by a UDF manager. Exemplary query execution management processes are described below with reference to FIGS. 3-7.

Query Execution Management

Figure 3:
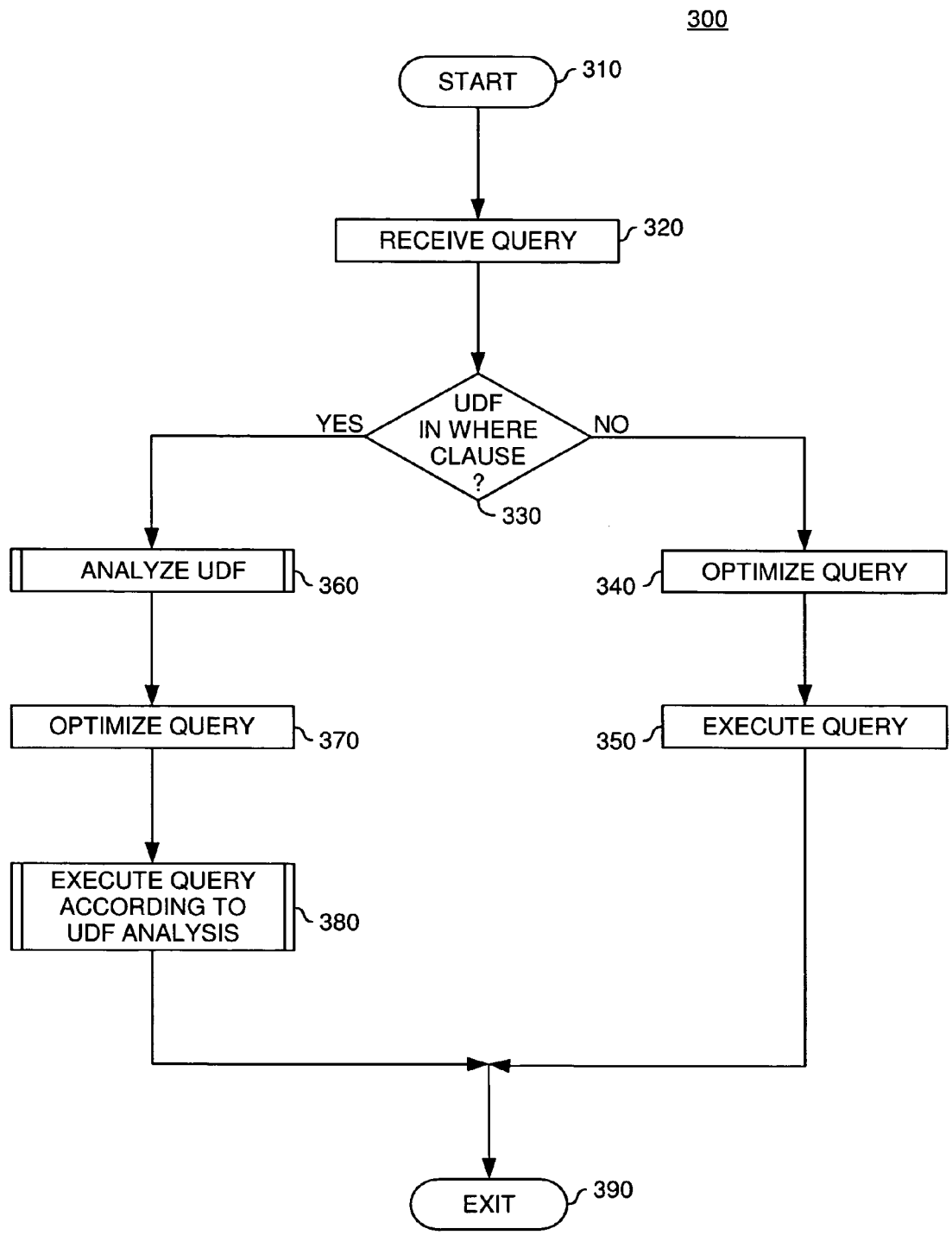
FIG. 3 is a flow chart illustrating query execution management in one embodiment.

Referring now to FIG. 3, one embodiment of a method 300 for query execution management is illustrated. According to one aspect, the method 300 is performed by a query execution manager (e.g., query execution manager 130 of FIG. 1A) and a UDF manager (e.g., UDF manager 132 of FIG. 1A). The method 300 starts at step 310.

At step 320, a query (e.g., query 120 of FIG. 1A) against one or more databases (e.g., database(s) 140 of FIG. 1A) is received from an issuing entity (e.g., application program 110 of FIG. 1A). In one embodiment, the received query is an SQL query. One of the most common executed SQL queries is the SELECT statement. The SELECT statement generally has the format: "SELECT<clause> FROM<clause> WHERE<clause> GROUP BY<clause> HAVING<clause> ORDER BY<clause>". The clauses must generally follow this sequence. Only the SELECT and FROM clauses are required and all other clauses are optional. The result of a SELECT statement is, in general, a subset of data retrieved from one or more existing tables stored in a relational database, wherein the FROM clause identifies the name of the table or tables from which the data is being selected. The subset of data is treated as a new table, termed the result table. The WHERE clause determines which rows should be returned in the result table. Generally, the WHERE clause contains one or more query conditions (e.g., selection criteria 124 of FIG. 1A) that must be satisfied by each row returned in the result table. The rows that meet the query condition(s) form an intermediate set, which is then processed further according to specifications in the SELECT clause. The SELECT clause may specify one or more result fields using UDFs. The query condition(s) are typically one or more predicates, each of which specifies a comparison between two values from certain columns, constants, correlated values or UDFs. Multiple predicates in the WHERE clause are typically connected by Boolean operators, such as Boolean AND and/or OR operators. An SQL query exemplifying the query 120 of FIG. 1A is shown below in Table I.

TABLE I

EXEMPLARY SQL QUERY

001: SELECT product_ID, Tax(product_ID), product_description
002: FROM product_table
003: WHERE product_price=500 AND gettype(product_name, "USA")=computer The exemplary SQL query of Table I is executed on a table "product_table" (line 002) having a multiplicity of columns including a "product_ID", "product_description", "product_price" and "product_name" column. Using this query, a user may try to retrieve all rows (line 001) from the "product_table" (line 002) that satisfy all query conditions defined by a WHERE clause (line 003). More specifically, the WHERE clause in line 003 includes two query conditions which are logically combined by a Boolean AND operator. The query conditions define that information relating to computers made in USA ("gettype(product_name, "USA")=computer") at a price of $500 ("product_price=500") should be retrieved. It should be noted that the exemplary SQL query of Table I filters products made in USA out of the "product_table" using a UDF "gettype" which takes as input values a product name ("product_name") and a chain of character ("USA") and returns a type of product, such as "computer". The query conditions are logically combined by the Boolean AND operator. For illustration, the SELECT clause (line 001 of Table I) also includes a UDF ("Tax") which returns, by way of example, an amount of turnover tax to be paid for a given product identified by a corresponding "product_D".

For purposes of illustration, the continuation of the description of FIG. 3 is explained with reference to the exemplary SQL query shown in Table I above. In other words, for the following explanations it is assumed that the exemplary SQL query of Table I has been received at step 320.

At step 330, the query execution manager determines whether the received SQL query includes a WHERE clause with at least one query condition having a UDF. If the WHERE clause of the SQL query does not include a query condition having a UDF, the received query is optimized at step 340. Accordingly, the query execution manager or a suitable query optimizer determines how to execute the received SQL query against the data in the database(s). Then, the query execution manager executes the optimized query at step 350 and processing exits at step 390. Optimizing and executing queries without UDFs can be performed according to any suitable techniques including techniques that are well-known in the art and is, therefore, not described in more detail.

If, however, at step 330 the query execution manager determines that the SQL query includes a query condition which is defined using a UDF, the UDF manager is accordingly notified. The UDF manager then analyzes the UDF at step 360. An exemplary method for analyzing a UDF is explained below with reference to FIG. 4. On the basis of the analysis performed by the UDF manager, the query execution manager optimizes the received SQL query at step 370. The optimized SQL query having the UDF is then executed at step 380. An exemplary method for executing a SQL query including a query condition having a UDF is described below with reference to FIG. 6A-B. Method 300 then exits at step 390.

UDF Analysis Runtime

Figure 4:
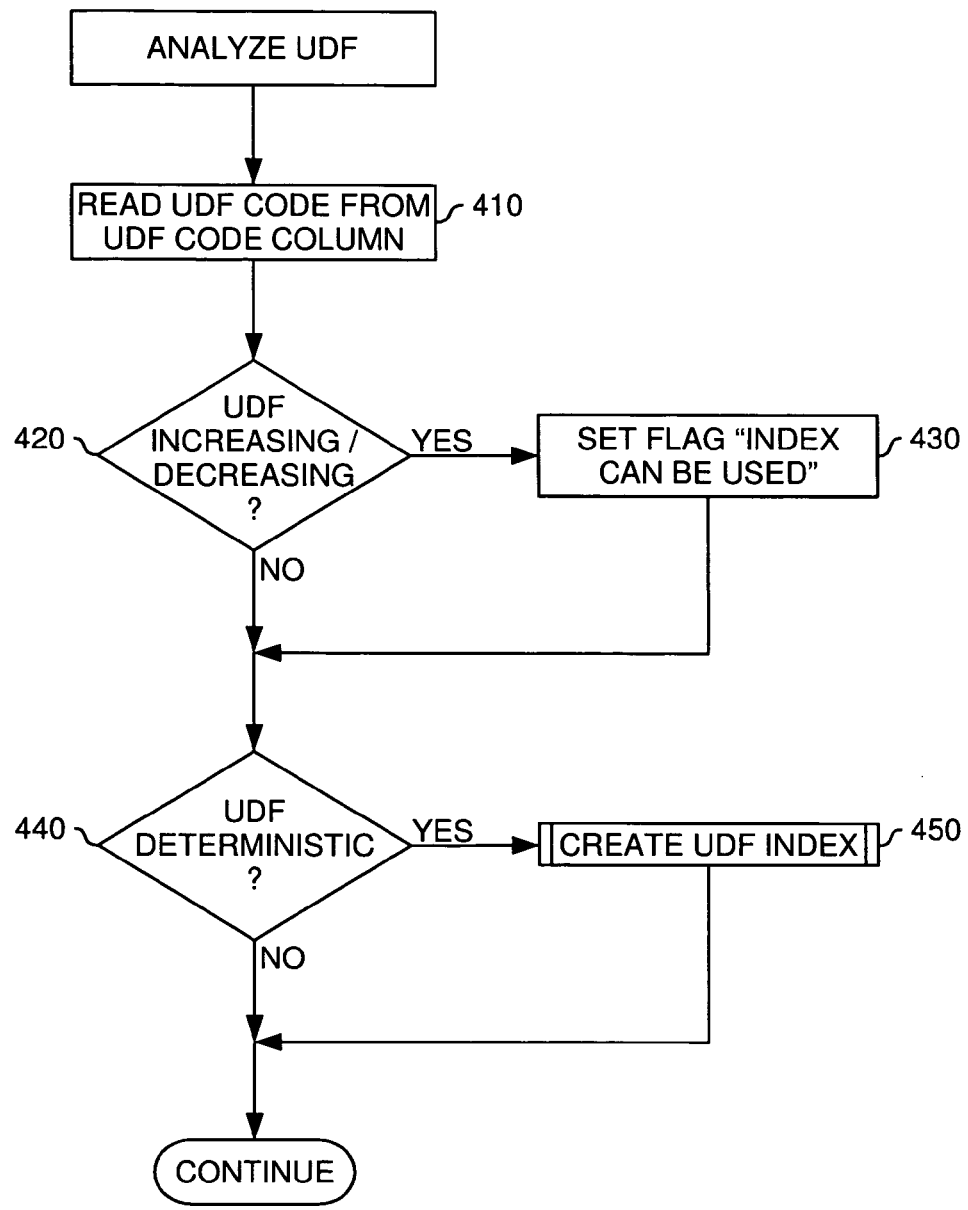
FIGS. 4-5 are flow charts illustrating analysis of a user-defined function in one embodiment.

Referring now to FIG. 4, one embodiment of a method 400 for analyzing a UDF (e.g., UDF 128 of FIG. 1A) according to step 360 of FIG. 3 is illustrated. According to one aspect, the method 400 is performed by a UDF manager (e.g., UDF manager 132 of FIG. 1A). Method 400 starts at step 410 for analyzing the UDF of the query condition determined at step 330 of FIG. 3.

At step 410, UDF code of the UDF is accessed and read. For instance, the UDF code can be retrieved from a "UDF code" column of a corresponding UDF table (e.g., "UDF code" column 179 of UDF table 146 of FIG. 1B).

At step 420, the UDF manager determines on the basis of the UDF code whether the UDF is increasing or decreasing. More specifically, many UDFs are designed such that a numeric number is input to a given UDF and another numeric number is output after execution of the given UDF. In other words, many users create UDFs to perform more or less complicated calculations, such as price and tax calculations. For example, for calculating the turnover tax for a given product, a price of the product is multiplied with a given predefined factor. Such UDFs may not be deterministic, but can return values which are increased or decreased with respect to corresponding input values. In other words, the larger the input values passed into the UDF are, the larger/smaller the output values can be. Thus, for an increasing or decreasing UDF, an approximation can be made to determine whether the UDF matches a comparison value specified in a corresponding query condition without executing the UDF for each input value. Accordingly, if the UDF manager determines that the UDF is not increasing or decreasing, processing continues at step 440. However, if the UDF manager determines that the UDF is increasing or decreasing, at step 430 a flag is set for the UDF which indicates that a database index can be used in execution of the query condition having the UDF. In other words, if a corresponding index (e.g. index 141 of FIG. 1A) is available for the query condition, it can be retrieved and used in query execution. Processing then continues at step 440.

At step 440, the UDF manager determines whether the UDF is deterministic. In the context of the present invention, the UDF is absolutely deterministic if it always produces the same result set for the same input values. If the UDF is not deterministic, processing continues at step 370 of method 300 of FIG. 3. If, however, the UDF is deterministic, a corresponding UDF index can be created for the UDF at step 450, such as a bitmap index, a dynamic bitmap index, a radix tree index or an EVI. Creation of the corresponding UDF index can be performed using any suitable techniques including techniques which are well-known in the art and is, therefore, not described in more detail. After creation of the corresponding UDF index at step 450, processing continues at step 370 of method 300 of FIG. 3.

Figure 5:
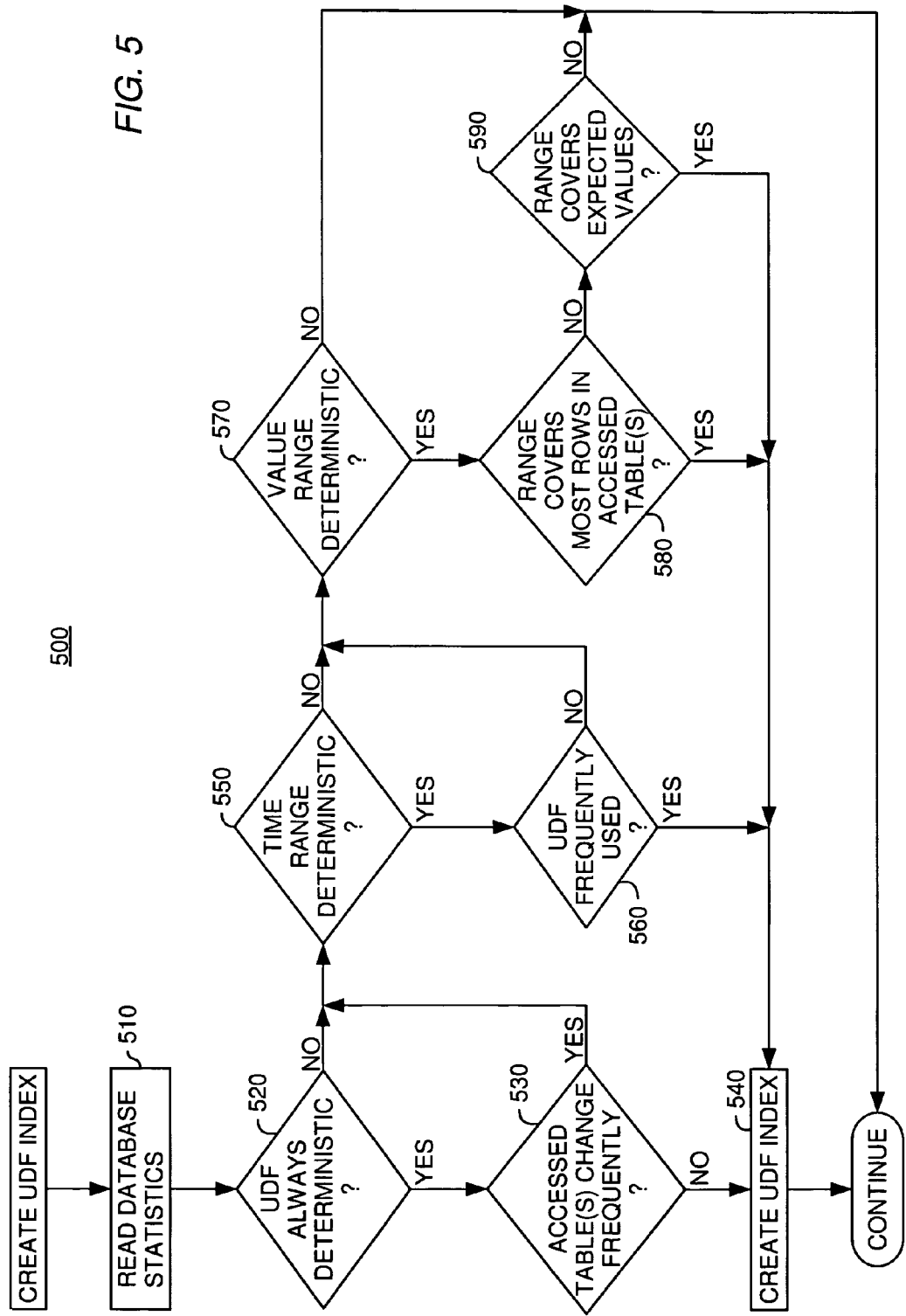

Referring now to FIG. 5, one embodiment of a method 500 for evaluating whether a UDF index should be created according to step 450 of FIG. 4 is illustrated. Accordingly, in the given example the method 500 is performed for the UDF of the query condition which has been determined at step 330 of FIG. 3. In one embodiment, the method 500 is performed by a UDF manager (e.g., UDF manager 132 of FIG. 1A).

The method 500 starts at step 510, where database statistics for the UDF are retrieved and read. Thus, a behavior pattern of the UDF can be determined. For instance, frequently used input values and/or returned output values can be identified. Furthermore, the behavior of the UDF over different value and/or time ranges can be determined.

At step 520, the UDF manager determines whether the UDF is always deterministic. For instance, a given UDF may always return a unique value given a unique input value. Once this unique value has been determined, any further execution of the given UDF, given the same unique input value, can be omitted. In order to determine whether the UDF is always deterministic, the UDF manager may determine whether a deterministic flag is set in a "deterministic" column of a corresponding UDF table (e.g., "deterministic" column 172 of UDF table 146 of FIG. 1B) containing the UDF. If the deterministic flag is not set in the corresponding UDF table, the UDF manager can make a decision on the basis of the database statistics.

In some cases, if database tables accessed in execution of a UDF are modified frequently, benefits gained by utilizing an index may be outweighed by having to frequently regenerate the index. Therefore, for some embodiments, even if the UDF is deterministic, the UDF manager determines at step 530 whether database tables accessed in execution of the UDF are frequently modified. To this end, the UDF manager may identify a list of accessed database tables from a "table dependencies" column of the corresponding UDF table (e.g., "table dependencies" column 178 of UDF table 146 of FIG. 1B). Then, using the database statistics, the UDF manager can determine whether the identified database table(s) is frequently modified. Therefore, the UDF manager can determine and compare a number of times when the identified database table(s) has been modified with a predetermined threshold value. The predetermined threshold value can be user-specific or application-specific. If the identified accessed database table(s) is frequently modified, i.e., the determined number of times exceeds the predetermined threshold value, a corresponding UDF index may require intensive maintenance, i.e., frequent updates which may outweigh any savings gained by utilizing the index. Therefore, additional verifications are performed if the identified accessed database table(s) is frequently modified. If, however, the identified accessed database table(s) is not frequently modified, the UDF manager creates a UDF index for the UDF at step 540. Processing then continues according to method 400 of FIG. 4.

If the UDF is not always deterministic or if the accessed database table(s) is frequently modified, the UDF manager determines at step 550 whether the UDF is deterministic for a given time range. For instance, a given UDF can be deterministic every day for a given period of time. More specifically, if the database table(s) accessed by the UDF is only updated at night, the UDF can be deterministic at day time. Alternatively, the UDF can be deterministic for a given period of time in which a corresponding query is valid. In this case, as long as the UDF is deterministic, execution of the UDF can be omitted after a corresponding output value(s) of the UDF has been determined once.

In order to determine whether the UDF is deterministic for a given time range, the UDF manager may determine whether a corresponding time range is indicated in a "time range" column of the corresponding UDF table (e.g., "time range" column 176 of UDF table 146 of FIG. 1B). If no time range is indicated in the corresponding UDF table, the UDF manager can make a decision on the basis of the database statistics. If the UDF is deterministic for a given time range, the UDF manager determines at step 560 whether the UDF is frequently used. More specifically, using the read database statistics the UDF manager can determine a number of times the UDF has been used previously. Then, the UDF manager can compare the number of times the UDF has been used previously with a predetermined threshold value. The predetermined threshold value can be user-specific or application-specific. If the UDF is not frequently used, i.e., the determined number of times does not exceed the predetermined threshold value, a corresponding UDF index may produce maintenance cost that is not justified by a frequency of use of the UDF index. Therefore, additional verifications are performed if the UDF is not frequently used. If, however, the UDF is frequently used, the UDF manager creates a UDF index for the UDF at step 540. Processing then continues according to method 400 of FIG. 4.

If the UDF is not deterministic for a given time range or the UDF is not deterministic for a given point of time when the query condition having the UDF is evaluated, or if the UDF is not frequently used, the UDF manager determines at step 570 whether the UDF is deterministic for a given value range. Specifically, the UDF must be deterministic for a given range of input values. For instance, assume a particular UDF performing the following IF clause: (IF xyz <100 THEN return xyz), where "xyz" is an integer value. This particular UDF takes as input the integer value "xyz" and returns this integer value whenever the input integer value is less than 100. Assume further that the particular UDF arbitrarily returns other values when the input integer value exceeds 100. In other words, the UDF is deterministic for all integer input values "xyz" less than 100, i.e. for a given value range which consists of integer values between 0 and 100. Thus, for the given value range execution of the UDF can be omitted as the output is always identical to the input.

In order to determine whether the UDF is deterministic for a given value range, the UDF manager may determine whether a corresponding value range is indicated in a "value range" column of the corresponding UDF table (e.g., "value range" column 175 of UDF table 146 of FIG. 1B). If no value range is indicated in the corresponding UDF table, the UDF manager can make a decision on the basis of the read database statistics. If the UDF is deterministic for a given value range, the UDF manager determines at step 580 whether the given value range covers a majority of possible input values contained in the accessed database table(s). More specifically, the UDF manager can determine the range of possible input values in the accessed database table(s) and compare the determined range of possible input values with the given value range to evaluate a range distance. If the determined range distance does not exceed a predetermined threshold value, it is assumed that the given value range covers the majority of possible input values. The predetermined threshold value can be user-specific or application-specific. If the given value range does not cover the majority of possible input values contained in the accessed database table(s), a corresponding UDF index may produce maintenance cost without being readily applicable as input values outside the given value range may frequently occur. Therefore, additional verifications are performed if the majority of possible input values is not covered. If, however, the given value range covers the majority of possible input values contained in the accessed database table(s), the UDF manager creates a UDF index for the UDF at step 540. Processing then continues according to method 400 of FIG. 4.

If the given value range does not cover the majority of possible input values, the UDF manager determines at step 590 whether the given value range covers at least values that are expected to be used as input values for the UDF. If the given value range covers expected input values, the UDF manager creates a UDF index for the UDF at step 540. Processing then continues according to method 400 of FIG. 4. If, however, the given value range does not cover the expected input values or if the UDF is not deterministic for a given value range, processing continues according to method 400 of FIG. 4 without creation of a corresponding UDF index.

As was noted above, after analysis of all UDFs contained in the WHERE clause of the SQL query according to step 360 of FIG. 3, the SQL query is optimized at step 370 and then executed at step 380 of FIG. 3. The SQL query may further include one or more UDFs in its SELECT clause. An exemplary method 600 for executing a SQL query (e.g., query 120 of FIG. 1A) having result criteria (e.g., result criteria 122 of FIG. 1A) including one or more UDFs (e.g., UDFs 126 of FIG. 1A) and selection criteria (e.g., selection criteria 124 of FIG. 1A) including one or more UDFs (e.g., UDFs 128 of FIG. 1A) is described below with reference to FIG. 6A-B.

Query Execution Runtime

Figure 6A:
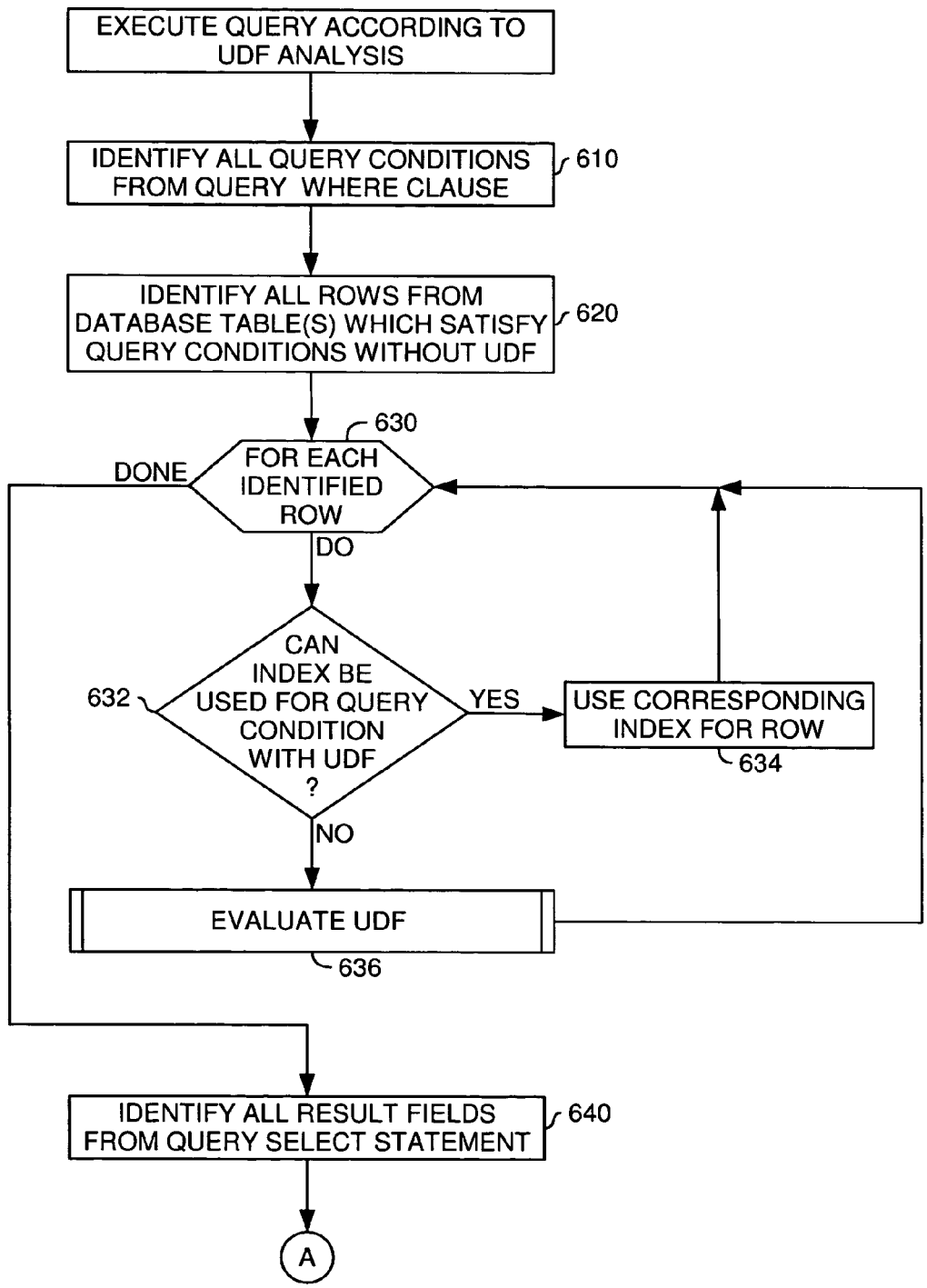
FIGS. 6A-B is a flow chart illustrating query execution management on the basis of the analysis of user-defined functions in one embodiment.
Figure 6B:
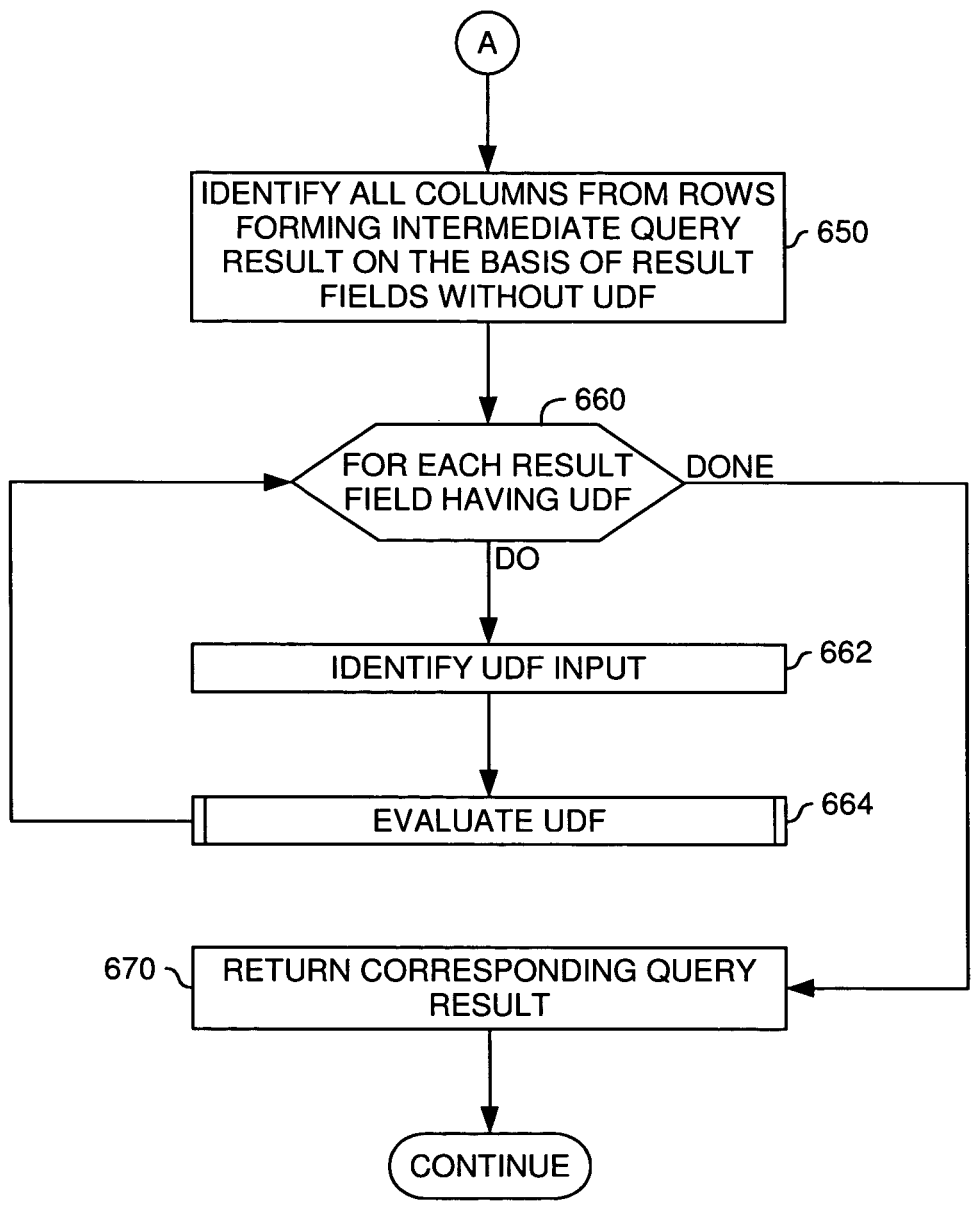

Referring now to FIG. 6A-B, one embodiment of a method 600 for executing a query including one or more UDFs according to step 380 of FIG. 3 is illustrated. According to one aspect, the method 600 is performed by a query execution manager (e.g., query execution manager 130 of FIG. 1A) and a UDF manager (e.g., UDF manager 132 of FIG. 1A). By way of example, the method 600 is described with reference to execution of the exemplary SQL query of Table I above. According to line 002 of Table I, the exemplary SQL query is executed against a database table "product_table". For brevity, assume that the database table "product_table" has a multiplicity of rows and a multiplicity of columns including at least "product_ID", "product_description", "product_price" and "product_name" columns having a multiplicity of values.

Method 600 starts at step 610, where the SQL query is parsed for identifying all query conditions contained in a WHERE clause of the SQL query. As was noted above, in the given example two query conditions are identified: (i) "product_price=500" and (ii) "gettype(product_name, "USA")=computer" (line 003 of Table I). At step 620, all query conditions which do not include UDFs (hereinafter referred to as "simple query conditions") are identified. Furthermore, all rows from the "product_table" are determined which satisfy the identified simple query conditions. In other words, in the given example the query condition "product_price=500" (line 003 of Table I) is identified as simple query condition and, accordingly, all rows of the "product_table" which include a value "500" in the "product_price" column can be identified.

Then, all query conditions which are defined using UDFs (hereinafter referred to as "UDF query conditions") are processed. To this end, at step 630 a loop consisting of steps 630, 632, 634 and 636 is entered for each possible result row. More specifically, in the given example the simple query condition and the UDF query condition are connected by a Boolean AND operator (line 003 of Table I). In other words, each row which is included in a corresponding query result (e.g., query result 150 of FIG. 1A) must simultaneously satisfy both query conditions. Accordingly, in the given example it is sufficient to perform the loop consisting of steps 630, 632, 634 and 636 on each identified row, i.e., each row which satisfies the simple query condition. However, in other cases where a simple query condition is connected to a UDF query condition using a Boolean OR operator, both query conditions must be evaluated with respect to all rows of a corresponding underlying database table(s).

In the given example, when the loop is entered for a given identified row, the UDF manager determines at step 632 whether an index can be used with respect to the given identified row for each UDF query condition. In one embodiment, this determination may include at least part of the UDF analysis according to method 400 of FIG. 4 and method 500 of FIG. 5. For instance, the UDF manager may determine whether the UDF is deterministic for input values provided with the given identified row. Furthermore, the UDF manager can determine whether a flag indicating that an index can be used with the UDF has been set at step 430 of method 400 of FIG. 4.

If an index can be used, the index is evaluated for the given identified row at step 634 to determine whether the given identified row satisfies the UDF query condition. Processing then returns to step 630 where the loop is entered for a next identified row.

If, however, the UDF manager determines at step 632 that no index can be used, the UDF is evaluated at step 636 for determining whether the given identified row satisfies the UDF query condition. An exemplary method for UDF evaluation is described below with reference to FIG. 7. Processing then also returns to step 630 where the loop is entered for a next identified row.

In the given example, the UDF manager identifies the query condition "gettype(product_name, "USA")=computer" (line 003 of Table I) as UDF query condition. Then the UDF manager determines from the identified rows of the "product_table" which satisfy the simple query condition, as described above, all rows which satisfy the UDF query condition. In other words, in the loop consisting of steps 630, 632, 634 and 636 the UDF manager determines from the identified rows all rows which include in the "product_name" column a value which causes the "gettype" UDF to return the value "computer".

Upon execution of the loop consisting of steps 630, 632, 634 and 636 for each of the rows which have been identified at step 620, processing continues at step 640. More specifically, if in the given example upon execution of the loop for each identified row, one or more rows have been identified which satisfy all UDF query conditions, these one or more rows form an intermediate result set. This intermediate result set is then analyzed at steps 640-664 to determine a final query result.

At step 640, the SQL query is parsed for identifying all result fields contained in a SELECT clause of the SQL query. The identified result fields are determined from the intermediate result set and constitute the final query result. Accordingly, in the given example three result fields are identified: (i) "product_ID", (ii) "Tax(product_ID)" and (iii) "product_description" (line 001 of Table I). At step 650, all result fields which do not include UDFs (hereinafter referred to as "simple result fields") are identified. Furthermore, all identified simple result fields are determined from the intermediate result set for the final query result. In other words, in the given example the result fields "product_ID" and "product_description" (line 001 of Table I) are identified as simple result fields and can be identified from the intermediate result set.

Then, all result fields which are defined using UDFs (hereinafter referred to as "UDF result fields") are processed. To this end, at step 660 a loop consisting of steps 660, 662 and 664 is entered for each UDF result field. Specifically, when the loop is entered for a given UDF result field, the UDF manager identifies corresponding input values for the UDF at step 662. More specifically, all result fields from the intermediate result set are identified which are required as input to the UDF. Then, at step 664, the UDF manager evaluates the UDF using the identified input values for determining corresponding output values of the UDF (e.g., by executing the UDF or retrieving cached results from a previous execution) which are to be included with the final query result. An exemplary method for UDF evaluation is described below with reference to FIG. 7. The corresponding output values of the UDF are then included with the final query result at step 664. Processing then returns to step 660 where the loop is entered for a next UDF result field.

In the given example, the result field "Tax(product_ID)" is identified as UDF result field. Then, all values from the "product_ID" column are determined from the intermediate result set and used for evaluation of the UDF "Tax". After evaluation of the UDF "Tax", corresponding output values are included with the final query result.

Upon execution of the loop consisting of steps 660, 662 and 664 for each UDF result field, determination of the final query result is completed. Processing then continues at step 670 where the final query result is provided to the issuing entity (e.g., application 110 of FIG. 1A). Processing then continues according to method 300 of FIG. 3.

UDF Evaluation

Figure 7:
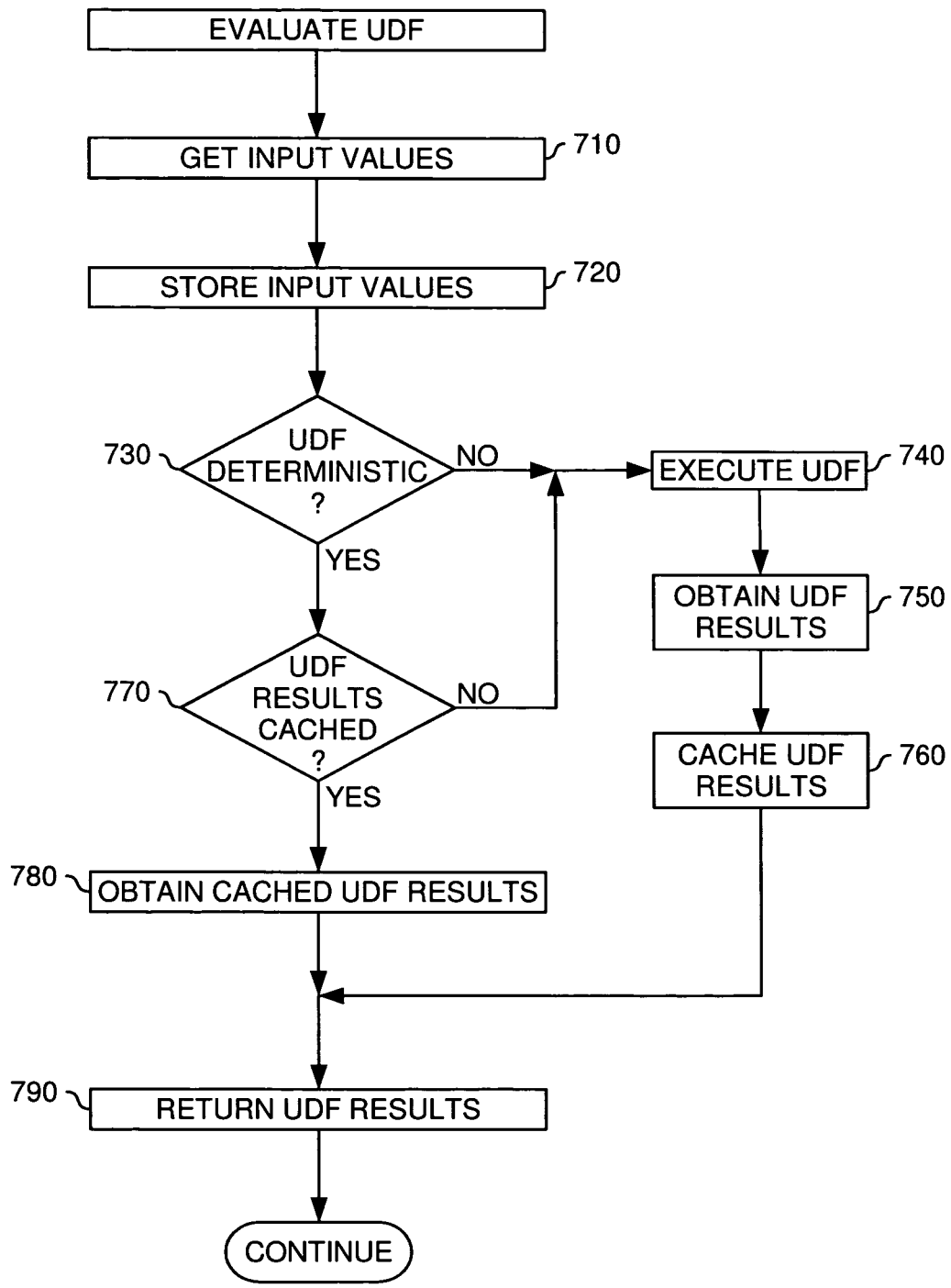
FIG. 7 is a flow chart illustrating execution of a user-defined function in one embodiment.

Referring now to FIG. 7, one embodiment of a method 700 for evaluating a UDF according to steps 636 and 664 of FIG. 6 is illustrated. In one embodiment, the method 700 is performed by a UDF manager (e.g., UDF manager 132 of FIG. 1A).

For a given UDF, the method 700 starts at step 710 where all input values for the UDF are received by the UDF manager. At step 720, the UDF manager stores the received input values. At step 730, the UDF manager determines whether the given UDF is deterministic. To this end, the UDF manager accesses in one embodiment a corresponding UDF table (e.g., UDF table 146 of FIG. 1B) which describes the given UDF. As was noted above, the UDF manager can use the corresponding UDF table for determining whether the given UDF is always deterministic, deterministic for each commit cycle, deterministic for a given value range or deterministic for a given time range. Alternatively, the UDF manager can perform at least a portion of the steps of method 500 for determining whether the given UDF is deterministic.

If the given UDF is not deterministic, the UDF manager executes the given UDF at step 740 using the stored input values. Thus, at step 750, the UDF manager obtains in response to execution of the given UDF corresponding output values defining UDF results. According to one aspect, the UDF manager caches the UDF results at step 760 and returns the UDF results at step 790. Processing then continues according to method 600 of FIG. 6.

If, however, the given UDF is deterministic, the UDF manager determines at step 770 whether corresponding UDF results for the deterministic UDF have been cached. To this end, the UDF manager accesses in one embodiment a cached UDF results table (e.g., cached UDF results table 147 of FIG. 1C) which may contain corresponding cached UDF results for the deterministic UDF, from a previous execution using the same input values. If no UDF results have been cached for the deterministic UDF, processing continues at step 740 as described above. If, however, UDF results have been cached for the deterministic UDF, the UDF manager retrieves the corresponding cached UDF results at step 780. Furthermore, according to one aspect the UDF manager determines whether the corresponding cached UDF results are suitable for use with the deterministic UDF. For instance, the UDF manager may determine whether the corresponding cached UDF results include output values for all stored input values of the deterministic UDF. To this end, the UDF manager may access an "input values" column of the cached UDF results table (e.g., "input values" column 192 of FIG. 1C) to compare all values in the "input values" column with the stored input values. If the input values match, the UDF manager may access an "output values" column (e.g., "output values" column 193 of FIG. 1C) of the cached UDF results table for determining whether corresponding output values are contained therein. Thus, if the cached UDF results are suitable for use with the deterministic UDF, execution of the UDF can be omitted as the UDF is deterministic. Processing then continues at step 790 as described above.

In various embodiments, the invention provides numerous advantages over the prior art. For instance, in general UDFs that perform SQL calls are considered non-deterministic because input values to such UDFs can be unknown until runtime and could conceivably change. In such cases, according to one aspect, temporary UDF indexes can be created for such UDFs in a manner allowing to invalidating these temporary UDF indexes when underlying data is modified. Furthermore, such temporary UDF indexes can be stored persistently as permanent indexes which are simply deleted and recreated each time changes to the underlying data occur.

Furthermore, in some embodiments UDF results which can be determined to be of certain values and not others can be used to avoid unnecessary executions of corresponding UDFs. For instance, UDFs are frequently used to convert to uppercase data entry, trim data entry etc. In such cases, if for example a user is trying to compare mixed case data with a field that is being uppercased, a corresponding UDF manager may recognize and avoid the corresponding operations.

It should be noted that any reference herein to particular values, definitions, programming languages and examples is merely for purposes of illustration. Accordingly, the invention is not limited by any particular illustrations and examples. Furthermore, while the foregoing is directed to embodiments of the present invention, other and further embodiments of the invention may be devised without departing from the basic scope thereof, and the scope thereof is determined by the claims that follow.

What is claimed is:

1. A computer-implemented method to speed up query execution involving user-defined functions, the method comprising:

receiving a query against data of a database, the query having at least one query condition invoking a first user-defined function using a field of the database as input to the first user-defined function, wherein the first user-defined function is configured to generate an output value based on an input value selected from a set of acceptable input values;

for each of a plurality of input values from the set of acceptable input values, performing multiple trial executions of the first user-defined function using the respective input value and independent of any execution of the first user-defined function as part of query execution, in order to determine, based on results thereof, whether the first user-defined function satisfies a predefined deterministic criterion over the plurality of input values;

upon determining, by operation of one or more computer processors, that the first user-defined function satisfies the predefined deterministic criterion and that cached results are available for the first user-defined function, using the cached results in execution of the query against the data of the database to determine a corresponding query result, without executing the first user-defined function for at least one input value of the set of acceptable input values, that is stored in the field of the database, thereby speeding up execution of the query; and upon determining that the first user-defined function satisfies the predefined deterministic criterion and that the cached results are not available for the first user-defined function, executing the user-defined function on a plurality of field values stored for the field of the database, wherein at least a subset of the results obtained in executing the first user-defined function is cached.

2. The computer-implemented method of claim 1, wherein determining whether the first user-defined function satisfies the predefined deterministic criterion comprises:

determining whether the user-defined function is associated with a deterministic flag.

3. The computer-implemented method of claim 1, wherein determining whether the first user-defined function satisfies the predefined deterministic criterion comprises:

determining whether the first user-defined function is deterministic for a predefined subset of the set of acceptable input values.

4. The method of claim 1, wherein determining whether the first user-defined function satisfies the predefined deterministic criterion comprises:

determining, at a given point of time, whether the first user-defined function is deterministic for a predetermined time range, the predetermined time range including the given point of time.

5. The method of claim 1, wherein determining whether the first user-defined function satisfies the predefined deterministic criterion comprises:

determining whether the first user-defined function is deterministic for a given commit cycle of the database.

6. The method of claim 1, wherein determining whether the first user-defined function satisfies the predefined deterministic criterion comprises:

determining whether database tables accessed in executing the first user-defined function have been modified since a last execution of the first user-defined function.

7. The computer-implemented method of claim 1, wherein the deterministic criterion conveys which input values for which the first user-defined function exhibits deterministic behavior, wherein execution of the query is sped up relative to having to execute the first user-defined function for each value that is stored in the field of the database and that optionally satisfies one or more remaining conditions of the received query;

wherein the method further comprises, upon determining that the first user-defined function does not satisfy the predefined deterministic criterion, executing the first user-defined function on the plurality of field values stored for the field of the database, wherein results obtained in executing the first user-defined function are not cached.

8. The computer-implemented method of claim 7, wherein whether the first user-defined function satisfies the predefined deterministic criterion over the set of acceptable input values is determined based on: (i) the results from the multiple trial executions and pertaining to a first subset of the set of acceptable input values, the first subset consisting of the plurality of input values and (ii) user input specifying whether the first user-defined function is deterministic over a second subset of the set of acceptable of input values, different from the first subset;

wherein the multiple trial executions of the first user-defined function are performed:

(i) without requiring any user input specifying to perform any trial execution of any user-defined function;

(ii) without requiring any user input specifying any of the plurality of input values;

(iii) only upon determining that it is unknown whether the user-defined function satisfies the predefined deterministic criterion over one or more input values; and (iv) only over the one or more input values.

9. The computer-implemented method of claim 8, wherein query is executed by an application configured to speed up query execution for each input value selected from a numerical input value and a string input value and for each output value selected from a numerical output value, a string output value, and a Boolean output value, wherein the application is further configured to:

determine that a second user-defined function satisfies the predefined deterministic criterion upon determining that the second user-defined function is associated with a deterministic flag.

10. The computer-implemented method of claim 9, wherein the application is further configured to:

determine whether a predefined subset of acceptable input values to the third user-defined function includes one or more field values stored for a field of the database, on which the third user-defined function is invoked; and determine that a third user-defined function satisfies the predefined deterministic criterion upon determining that the third user-defined function is deterministic for the predefined subset of acceptable input values to the third user-defined function;

wherein query execution is sped up by caching results of the third user-defined function only over the predefined subset of acceptable input values to the third user-defined function.

11. The computer-implemented method of claim 10, wherein the application is further configured to:

determine that a fourth user-defined function satisfies the predefined deterministic criterion upon determining that, at a given point of time, the fourth user-defined function is deterministic for a predetermined time range, the predetermined time range including the given point of time, wherein query execution is sped up by caching results of the fourth user-defined function only during the predetermined time range; and determine that a fifth user-defined function satisfies the predefined deterministic criterion upon determining that the fifth user-defined function is deterministic for a given commit cycle of the database, wherein query execution is sped up by caching results of the fifth user-defined function only during the given commit cycle of the database.

12. The computer-implemented method of claim 11, wherein the application is further configured to:

determine that a sixth user-defined function satisfies the predefined deterministic criterion upon determining that the database tables accessed in executing a sixth user-defined function have been modified since a last execution of the sixth user-defined function; and upon determining that a seventh user-defined function satisfies a predefined index applicability criterion, generate an index over relevant data of the database and for the seventh user-defined function, wherein the predefined index applicability criterion is satisfied upon determining that the seventh user-defined function is at least one of incremental, decremental, and deterministic.

13. The computer-implemented method of claim 12, wherein the application is further configured to determine each predefined index applicability criterion selected from:
  (i) the seventh user-defined function being an incremental user-defined function, wherein query execution is sped up by inferring, for at least one value stored in the field of the database, comparison results on the basis of the seventh user-defined function being incremental and without having to execute the seventh user-defined function over the at least one value stored in the field of the database;
  (ii) the seventh user-defined function being a decremental user-defined function, wherein query execution is sped up by inferring, for at least one value stored in the field of the database, comparison results on the basis of the seventh user-defined function being decremental and without having to execute the seventh user-defined function over the at least one value stored in the field of the database; and
  (iii) the seventh user-defined function being a deterministic user-defined function, wherein query execution is sped up by caching results of the fifth user-defined function over all values stored in the field of the database and that optionally satisfy one or more remaining conditions of the received query.

14. A computer-readable storage medium containing a program executable to perform an operation to speed up query execution involving user-defined functions, the operation comprising:
  receiving a query against data of a database, the query having at least one query condition invoking a first user-defined function using a field of the database as input to the first user-defined function, wherein the first user-defined function is configured to generate an output value based on an input value selected from a set of acceptable input values;
  for each of a plurality of input values from the set of acceptable input values, performing multiple trial executions of the first user-defined function using the respective input value and independent of any execution of the first user-defined function as part of query execution, in order to determine, based on results thereof, whether the first user-defined function satisfies a predefined deterministic criterion over the plurality of input values;
  upon determining, by operation of one or more computer processors when executing the program, that the first user-defined function satisfies a predefined deterministic criterion and that cached results are available for the first user-defined function, using the cached results in execution of the query against the data of the database to determine a corresponding query result, without executing the first user-defined function for at least one input value of the set of acceptable input values, that is stored in the field of the database, thereby speeding up execution of the query; and
  upon determining that the first user-defined function satisfies the predefined deterministic criterion and that the cached results are not available for the first user-defined function, executing the user-defined function on a plurality of field values stored for the field of the database, wherein at least a subset of the results obtained in executing the first user-defined function is cached.

15. The computer-readable storage medium of claim 14, wherein determining whether the first user-defined function satisfies the predefined deterministic criterion comprises: determining whether the user-defined function is associated with a deterministic flag.

16. The computer-readable storage medium of claim 14, wherein determining whether the first user-defined function satisfies the predefined deterministic criterion comprises:
  determining whether the first user-defined function is deterministic for a predefined subset of the set of acceptable input values.

17. The computer-readable storage medium of claim 14, wherein determining whether the first user-defined function satisfies the predefined deterministic criterion comprises:
  determining, at a given point of time, whether the first user-defined function is deterministic for a predetermined time range, the predetermined time range including the given point of time.

18. The computer-readable storage medium of claim 14, wherein determining whether the first user-defined function satisfies the predefined deterministic criterion comprises:
  determining whether the first user-defined function is deterministic for a given commit cycle of the database.

19. The computer-readable storage medium of claim 14, wherein determining whether the first user-defined function satisfies the predefined deterministic criterion comprises:
  determining whether database tables accessed in executing the first user-defined function have been modified since a last execution of the first user-defined function.

20. A data processing system to speed up query execution involving user-defined functions, the data processing system comprising:
  one or more computer processors;
  a database having data; and
  a query execution manager residing in memory and configured for, when executed by the one or more computer processors:
    receiving a query against the data of the database, the query having at least one query condition invoking a first user-defined function using a field of the database as input to the first user-defined function, wherein the first user-defined function is configured to generate an output value based on an input value selected from a set of acceptable input values;
    for each of a plurality of input values from the set of acceptable input values, performing multiple trial executions of the first user-defined function using the respective input value and independent of any execution of the first user-defined function as part of query execution, in order to determine, based on results thereof, whether the first user-defined function satisfies a predefined deterministic criterion over the plurality of input values;
    upon determining that the first user-defined function satisfies a predefined deterministic criterion and that cached results are available for the first user-defined function, using the cached results in execution of the query against the data of the database to determine a corresponding query result, without executing the first user-defined function for at least one input value of the set of acceptable input values, that is stored in the field of the database, thereby speeding up execution of the query; and
    upon determining that the first user-defined function satisfies the predefined deterministic criterion and that the cached results are not available for the first user-defined function, executing the user-defined function on a plurality of field values stored for the field of the database, wherein at least a subset of the results obtained in executing the first user-defined function is cached.

21. The data processing system of claim 20, wherein determining whether the first user-defined function satisfies the predefined deterministic criterion comprises:
   determining whether the user-defined function is associated with a deterministic flag.

22. The data processing system of claim 20, wherein determining whether the first user-defined function satisfies the predefined deterministic criterion comprises:
   determining whether the first user-defined function is deterministic for a predefined subset of the set of acceptable input values.

23. The data processing system of claim 20, wherein determining whether the first user-defined function satisfies the predefined deterministic criterion comprises:
   determining, at a given point of time, whether the first user-defined function is deterministic for a predetermined time range, the predetermined time range including the given point of time.

24. The data processing system of claim 20, wherein determining whether the first user-defined function satisfies the predefined deterministic criterion comprises:
   determining whether the first user-defined function is deterministic for a given commit cycle of the database.

25. The data processing system of claim 20, wherein determining whether the first user-defined function satisfies the predefined deterministic criterion comprises:
   determining whether database tables accessed in executing the first user-defined function have been modified since a last execution of the first user-defined function.

\* \* \* \* \*